UNITED STATES PATENT OFFICE.

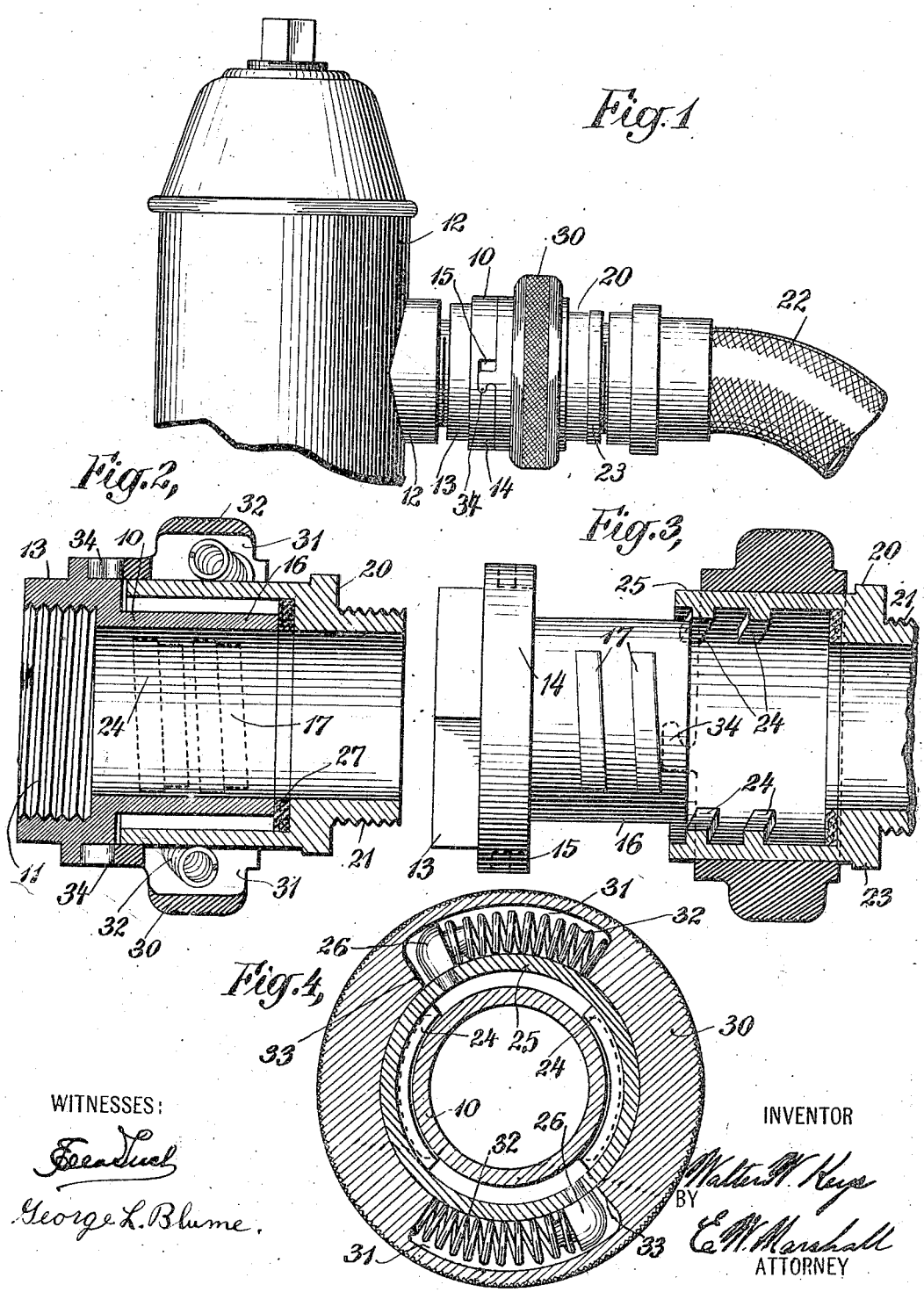

WALTER W. KEYS, OF YONKERS, NEW YORK.

HOSE-COUPLING.

959,226.

Specification of Letters Patent.  Patented May 24, 1910.

Application filed June 1, 1909. Serial No. 499,521.

*To all whom it may concern:*

Be it known that I, WALTER W. KEYS, a citizen of the United States, and a resident of the city of Yonkers, in the county of Westchester and State of New York, United States of America, have invented certain new and useful Improvements in Hose-Couplings, of which the following is a specification.

My invention relates to hose couplings, and its object is to improve upon arrangements of this kind, and to provide a simple and efficient coupling which shall have advantages over such devices as are now known.

I will describe my invention in the following specification and point out the novel features thereof in the appended claims.

Referring to the drawings, Figure 1 shows in side elevation a portion of a hydrant with a hose attached thereto by means of one of my improved couplings. Fig. 2 is a sectional side elevation of the coupling with its parts together. Fig. 3 is a side elevation of the same parts in different relative positions, and with the inner member of the coupling shown in section. Fig. 4 is a sectional end view of the coupling.

Like characters of reference designate corresponding parts in all of the figures.

10 designates the inner end of a coupling which may be threaded at 11 so that it may be affixed to a hydrant 12, or to the end of a pipe or hose, or to other desired fluid conductor. The portion 13 outside of this threaded part may be made with flattened faces or otherwise arranged to be acted upon by a wrench. Immediately in front of this portion 13 the member 10 is constructed to form an annular collar 14 in which two or more locking pockets 15 are provided. These pockets are of the peculiar form shown and adapted to receive and to fit locking lugs which I will describe later. The rest of this inner member is carried forward in the form of a hollow cylinder 16 from the outer surface of which projects segmental threads 17.

20 is the outer member of the coupling. This is a cylindrical shell one end of which is threaded at 21 for the reception of a hose 22, or pipe, or any other device which is to be connected by the coupling. 23 is a collar formed on the outer portion of the member directly back of this threaded part. From the inner surface of this member 20 project segmental threads 24 which are arranged to engage with the segmental threads 17. The outer surface 25 of this member from the collar 23 back is a smooth cylinder from which project lugs 26. 30 is a locking collar which is fitted over this cylindrical surface of the member 20 and is arranged to be moved rotatably and longitudinally thereon. This locking collar is provided with internal recesses as shown at 31 for the reception of compression springs 32. These springs abut against the lugs 26 and tend to rotate the collar about the outer member 20 until the ends 33 of its recesses come in contact with these lugs. This locking collar has projecting from one of its sides locking lugs 34 which correspond in shape and in number with the pockets 15 in the inner member 10. The pockets are, however, cut away so that the lugs may be thrust into them but afterward turned so that a portion of each of them will be moved into the base of the pocket. The outer surface of the locking collar is preferably knurled to facilitate its operation.

The parts of this device have been pointed out, and I will now describe the manner in which it is used.

Let us assume that the part 10 is upon a hydrant and that the part 20 is upon the end of a hose. The outer member is first thrust over the inner member. The segmental threads 17 and 24 are each somewhat less than one quarter of the circumference of the surfaces from which they project so that the two main parts of the coupling may be thus put together. A packing ring 27 may be placed within the member 20 against which the end of the part 16 of the inner member will seat when the inner and outer members are thus brought together. A shoulder is formed within the member 20 to support this packing. This part of the operation may be accomplished by grasping the locking collar. The latter is now rotated to the right. This performs two functions. In the first place, through the compression springs 32 it rotates the outer member in relation to the part upon the hydrant to force the threads 17 and 24 together and to push the part 16 of the inner member against the packing. This, at the same time, brings the locking lugs 34 into alinement with the pockets 15. The collar 30 is then pushed longitudinally until the lugs enter these pockets. While in this position the collar is released and the springs 32 will rotate the collar slightly to cause the locking lugs to be caught within the pockets which, as has been pointed out, are constructed to receive them. The two parts are thus securely locked together. It is to be noted that the pressure of the springs is now opposed by both the inner and outer members in the directions which tend to force their segmental threads together. This operation has been described quite at length in order to clearly set forth the invention, but the entire operation may be accomplished almost instantaneously. This coupling forms a perfectly tight joint which is capable of withstanding great pressures. Internal pressures have no tendency to loosen the connection thus made, but the coupling may be readily disconnected at will by simply reversing the manual operations above described.

This invention is especially adaptable for use with fire hose as it fulfils the need of something whereby a tight connection may be made quickly, and which is simple in construction and not at all likely to get out of order. But the invention, obviously, is not limited to this specific use.

What I claim is,—

1. A coupling for fluid conductors comprising an inner member and an outer member, means for connecting said members, a locking collar upon one of the members, and a spring between the collar and said member, said collar being arranged to be brought into engagement with the other member and to cause the spring to force said connecting means together.

2. A coupling for fluid conductors comprising an inner member, an outer member, means for forcing said members together, and a spring-pressed collar mounted upon the outer member and arranged to be brought into locking engagement with the inner member by a combined rotary and sliding movement, and to act upon said forcing means to lock said members together.

3. A coupling for fluid conductors comprising an inner member and an outer member, said members being provided with threads whereby they may be held together, a collar rotatably and slidably mounted upon the outer surface of the outer member and arranged to engage with the inner member, and a spring associated with said collar and arranged to force said threads together when said collar is engaged with the inner member.

4. A coupling for fluid conductors comprising an inner member provided with segmental threads, an outer member provided with segmental threads adapted to pass and to engage with the threads upon the inner member, whereby said members may be held together, a collar rotatably and slidably mounted upon the outer surface of the outer member and arranged to engage with the inner member, and a spring connected with the collar and the outer member and arranged to force said threads together when said collar is engaged with the inner member.

5. A coupling for fluid conductors comprising an inner member provided with pockets, an outer member, means for engaging said members together, a collar mounted upon the outer member, a spring connection between said collar and the outer member, said collar being provided with lugs adapted to fit into said pockets upon a combined rotary and sliding movement of the collar against the action of the spring to thereby lock said members together.

6. A coupling for fluid conductors comprising an inner member having segmental threads thereon, and provided with pockets, an outer member having segmental threads adapted to pass and to engage with the threads on the inner member, and a spring-pressed locking collar rotatably and slidably mounted upon said outer member and having locking lugs arranged to fit into said pockets and to force said threads together.

7. A coupling for fluid conductors comprising an inner member having external segmental threads thereon and provided with pockets, an outer member having internal segmental threads adapted to pass and to engage with the threads on the inner member to hold said members together; a collar rotatably and slidably mounted upon the outer surface of the outer member, said collar having locking lugs arranged to fit into the pockets in the inner member, and a spring connected with said collar and the outer member and arranged to force said threads together when the locking collar is in engagement with the inner member.

8. A coupling for fluid conductors comprising an inner member having a pair of externally projecting segmental threads thereon and provided with a plurality of receiving pockets, an outer member having a pair of internally projecting segmental threads adapted to pass and to engage with the threads on the inner member to hold said members together; a collar rotatably and slidably mounted upon the outer surface of the outer member, said collar having a plurality of locking lugs projecting from one side thereof and arranged to fit into the receiving pockets in the inner member, and springs within the collar connected with said collar and with the outer member and arranged to force said threads together when the collar is in engagement with the inner member, to thereby lock the inner and outer members together.

In testimony whereof I have signed my name to this specification in the presence of two subscribing witnesses.

WALTER W. KEYS.

Witnesses:
ROGER W. FLAGG,
H. J. HUMISTON.